United States Patent
Yoshihara et al.

(10) Patent No.: US 10,744,939 B2
(45) Date of Patent: *Aug. 18, 2020

(54) ALARM SYSTEM FOR VEHICLE

(71) Applicant: MAZDA MOTOR CORPORATION, Hiroshima (JP)

(72) Inventors: Toshiki Yoshihara, Hatsukaichi (JP); Yoshitsugu Hanada, Hiroshima (JP); Kazuhito Hayashi, Cardiff Irvine, CA (US); Koji Kagami, Hiroshima (JP); Hiromichi Nomura, Hiroshima (JP); Kazuya Maruoka, Hiroshima (JP); Yuki Okamoto, Hatsukaichi (JP); Yuki Yoshida, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/410,633

(22) Filed: May 13, 2019

(65) Prior Publication Data
US 2019/0366925 A1  Dec. 5, 2019

(30) Foreign Application Priority Data
Jun. 1, 2018 (JP) .................................. 2018-106369

(51) Int. Cl.
*B60Q 1/00* (2006.01)
*B60Q 9/00* (2006.01)
(Continued)

(52) U.S. Cl.
CPC ............ *B60Q 9/008* (2013.01); *G01S 13/867* (2013.01); *G01S 13/886* (2013.01); *G01S 13/931* (2013.01); *G01S 2013/932* (2020.01)

(58) Field of Classification Search
None
See application file for complete search history.

(56) References Cited

U.S. PATENT DOCUMENTS 5,483,453 A * 1/1996 Uemura ............... G05D 1/0246
                                                180/179
6,566,999 B2 * 5/2003 Iwasaki ..................... B60T 7/22
                                                340/435
(Continued)

FOREIGN PATENT DOCUMENTS

EP    2036791 A1    3/2009
EP    2833335 A1    2/2015
(Continued)

OTHER PUBLICATIONS

The partial European search report issued by the European Patent Office dated Oct. 18, 2019, which corresponds to European Patent Application No. 19174266.7-1203 and is related to U.S. Appl. No. 16/410,633.

(Continued)

*Primary Examiner* — Julie B Lieu
(74) *Attorney, Agent, or Firm* — Studebaker & Brackett PC (57) ABSTRACT

To provide an alarm system for a vehicle that can reduce alarms that can irritate a driver. An alarm system 1 for a vehicle includes an alarm line setting part 51 that sets a right alarm line 61 and a left alarm line 62 in front of a vehicle 2, and an alarm unit control part 55 that activates a speaker 41 and a display 42 when the velocity of the vehicle 2 is equal to or less than a predetermined velocity and a collision determination part 53 determines that an object will cross the right alarm line 61 or the left alarm line 62 within a predetermined time. When the vehicle 2 is decelerating, the alarm unit control part 55 performs an alarm reduction control that suppresses operation of the speaker 41 compared with when the vehicle 2 is not decelerating.

14 Claims, 6 Drawing Sheets

(51) Int. Cl.
　　　G01S 13/86　　　(2006.01)
　　　G01S 13/88　　　(2006.01)
　　　G01S 13/931　　(2020.01)

(56) References Cited

U.S. PATENT DOCUMENTS

| | | | |
|---|---|---|---|
| 2009/0128318 A1 | 5/2009 | Nagata et al. | |
| 2015/0046038 A1 | 2/2015 | Kawamata et al. | |
| 2016/0140847 A1* | 5/2016 | Kawamata | G08G 1/163 701/36 |
| 2018/0178721 A1* | 6/2018 | Ikedo | B60Q 1/346 |
| 2019/0033443 A1* | 1/2019 | Yoshikawa | G01S 13/931 |
| 2019/0176887 A1* | 6/2019 | Yasuda | G08G 1/16 |
| 2019/0366921 A1* | 12/2019 | Yoshida | B60Q 9/00 |
| 2019/0366924 A1* | 12/2019 | Yoshihara | B60Q 9/008 |
| 2019/0366925 A1* | 12/2019 | Yoshihara | G08G 1/166 |

FOREIGN PATENT DOCUMENTS

| | | |
|---|---|---|
| JP | 2012-160103 A | 8/2012 |
| WO | 2017/170979 A1 | 10/2017 |

OTHER PUBLICATIONS

The extended European search report issued by the European Patent Office dated Jan. 31, 2020, which corresponds to European Patent Application No. 191742661-1203 and is related to U.S. Appl. No. 16/410,633.

* cited by examiner

ALARM SYSTEM FOR VEHICLE

BACKGROUND OF THE INVENTION

Field of the Invention

The present invention relates to an alarm system for a vehicle. In particular, it relates to an alarm system for a vehicle that raises an alarm in response to an object approaching the vehicle.

Description of the Related Art

Systems that raise an alarm in response to an object approaching have been proposed. For example, Japanese Patent Laid-Open No. 2012-160103 discloses a system that determines the possibility of an object located at the side of a vehicle colliding with the vehicle based on the distance between the object and the vehicle or the relative velocity of the object with respect to the vehicle. When the system determines that the object can collide with the vehicle, the system raises an alarm to the driver of the vehicle.

The system described in Japanese Patent Laid-Open No. 2012-160103 determines the stopping distance of each object existing around the vehicle (that is, the distance the object moves before the object is stopped). The system activates an alarm unit when the stopping distance of an object is greater than the distance between the object and the vehicle. Such a system has an advantage that the system can alert the driver to an object that is less conspicuous to the driver to avoid collision with the object.

The system described in Japanese Patent Laid-Open No. 2012-160103 determines that an object around the vehicle can collide with the vehicle and raises an alarm when the object satisfies a physical condition relating to collision. However, such a system can raise a false alarm when the physical condition does not accurately reflect the actual possibility of collision. That is, even when the object is actually unlikely to collide with the vehicle, such a system can raise an alarm, and such an alarm can irritate the driver.

The present invention has been made to solve the problem described above, and an object of the present invention is to provide an alarm system for a vehicle that can reduce alarms that can irritate a driver.

SUMMARY OF THE INVENTION

To solve the problem described above, the present invention provides an alarm system for a vehicle, comprising: an alarm line setting part that sets an alarm line extending forward from the vehicle; an object detection part that detects an object on a side of the vehicle; a collision determination part that determines whether or not the object crosses the alarm line within a predetermined time; and an alarm unit control part that activates an alarm unit when the collision determination part determines that the object crosses the alarm line within the predetermined time, wherein the alarm unit control part performs an alarm reduction control to reduce operation of the alarm unit when the vehicle is decelerating compared with when the vehicle is not decelerating.

For example, when the vehicle is decelerating to temporarily stop, the possibility of an object on a side of the vehicle colliding with the vehicle is lower than when the vehicle is not decelerating. For this reason, with the arrangement described above, the alarm unit control part performs the alarm reduction control to reduce operation of an alarm unit when the vehicle is decelerating compared with when the vehicle is not decelerating. As a result, more alarms can be raised to the driver when the possibility of the object colliding with the vehicle is relatively high, whereas alarms that can irritate the driver can be reduced when the possibility of the object colliding with the vehicle is relatively low.

According to the present invention, preferably, the alarm unit includes a first alarm device and a second alarm device, and the alarm unit control part activates the first alarm device and the second alarm device when the vehicle is not decelerating; and the alarm unit control part does not activate the first alarm device but activates the second alarm device as the alarm reduction control when the vehicle is decelerating.

With this arrangement, when the vehicle is decelerating (that is, when the possibility of the object colliding with the vehicle is relatively low), the alarm unit control part does not activate the first alarm device and thereby can reduce alarms that can irritate the driver.

According to the present invention, preferably, the first alarm device audibly raises an alarm, and the second alarm device visually raises an alarm.

An audible alarm is more likely to irritate the driver than a visual alarm. With the arrangement described above, when the vehicle is decelerating (that is, when the possibility of the object colliding with the vehicle is relatively low), the audible alarm is not raised, so that the driver is less likely to be irritated by alarms.

According to the present invention, preferably, the alarm unit control part activates the alarm unit when a velocity of the vehicle is equal to or greater than a predetermined velocity; and the alarm unit control part does not perform the alarm reduction control when the vehicle starts after having decelerated from a velocity greater than the predetermined velocity and stopped.

For example, when the vehicle temporarily stops at the intersection and then starts to enter the intersection, the possibility of the vehicle colliding with another vehicle entering the intersection from another direction increases. With this arrangement, the alarm reduction control is not performed in such a situation, so that the driver can be alerted with reliability.

According to the present invention, preferably, the alarm unit control part performs the alarm reduction control when a deceleration of the vehicle becomes equal to or greater than a predetermined deceleration.

With this arrangement, the alarm unit control part can be prevented from performing the alarm reduction control in response to a slight deceleration of the vehicle and thus failing to alert the driver.

According to the present invention, preferably, the alarm system for a vehicle further comprises a traffic signal detection part that detects a traffic signal emitted by a traffic light in the direction of traveling of the vehicle, and the alarm unit control part performs the alarm reduction control when the traffic light is emitting a stop signal.

With this arrangement, when the vehicle is decelerating in response to the stop signal, the alarm reduction control can be performed with reliability.

Advantages of the Invention

The present invention can provide an alarm system for a vehicle that can reduce alarms that can irritate a driver.

DETAILED DESCRIPTION OF THE PREFERRED EMBODIMENTS

In the following, embodiments will be described with reference to the accompanying drawings. To facilitate understanding of the description, the same components are denoted by like reference numerals throughout the drawings, and redundant descriptions thereof will be omitted.

Figure 1:
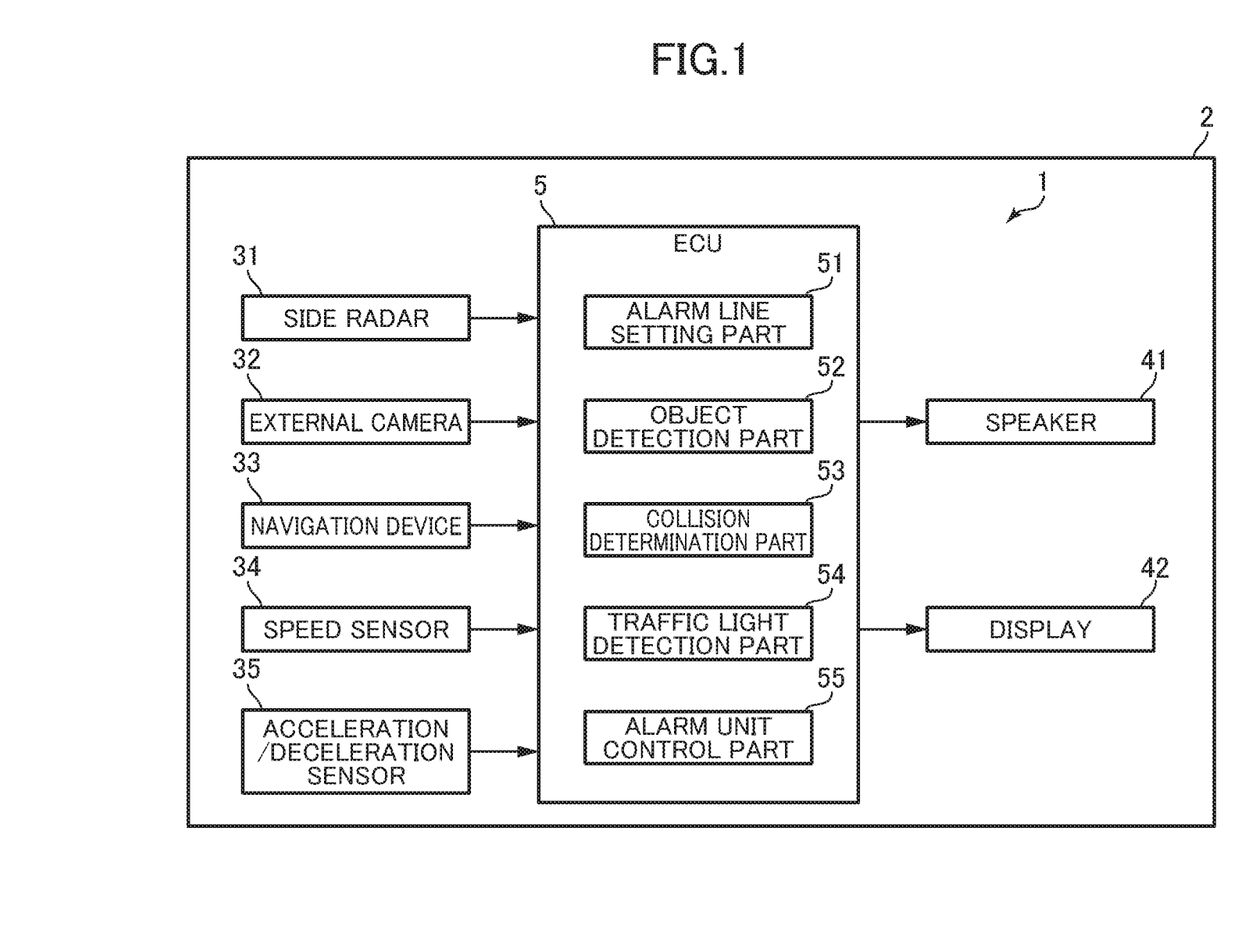
FIG. 1 is a block diagram showing an alarm system for a vehicle according to an embodiment.

First, with reference to FIG. 1, a configuration of an alarm system 1 for a vehicle (referred to simply as an alarm system 1, hereinafter) according to an embodiment will be described. FIG. 1 is a block diagram showing the alarm system 1.

The alarm system 1 is mounted on a vehicle and raises an alarm to the driver of the vehicle to alert the driver. In this specification, the vehicle on which the alarm system 1 is mounted will be referred to as a "vehicle 2". The alarm system for a vehicle according to the present invention can be applied not only to a four-wheeled vehicle but also to a two-wheeled vehicle.

In this specification, the direction in which the vehicle 2 runs forward is defined as "forward", and the direction in which the vehicle 2 runs backward is defined as "backward". The left side of the vehicle running forward is defined as "left", and the right side of the vehicle running forward is defined as "right".

The alarm system 1 includes a side radar 31, an external camera 32, a navigation device 33, a speed sensor 34, and an acceleration/deceleration sensor 35. The alarm system 1 further includes a speaker 41, a display 42 and an electronic control unit (ECU) 5.

The side radar 31 is used to detect the presence of an object outside of the vehicle 2, the velocity of the object, and the distance between the object and an alarm line, which will be described later. Detectable objects include a vehicle, a structure fixed on a road, and a pedestrian, for example. The vehicle is not limited to a four-wheeled vehicle but may be any running body, such as a two-wheeled vehicle or a bicycle. As described later, the detections described above performed by the side radar 31 are targeted to an object in a detection region set at a side of the vehicle 2. The side radar 31 is a millimeter wave radar (which has an operating frequency of 76 GHz to 77 GHz), for example, and has antennas directed to the left and right of the vehicle 2. Each antenna may be a single antenna used for both transmission and reception or a set of a transmitting antenna element and a receiving antenna element. The side radar 31 transmits a measuring wave from the antennas to the sides of the vehicle 2 and receives a reflection wave from an object. The side radar 31 transmits a signal corresponding to the received reflection wave to the ECU 5.

The external camera 32 takes an image of a range including the detection region of the side radar 31 and obtains image information. The external camera 32 is an image sensor, for example, and is installed on a rear view mirror (not shown) or the like of the vehicle 2. The external camera 32 transmits a signal corresponding to the obtained image information.

The navigation device 33 provides predetermined information to a passenger of the vehicle 2. The navigation device 33 stores map information or obtains map information by communicating with a server outside the vehicle 2. The map information includes information about roads, intersections, traffic lights, buildings or the like. The navigation device 33 has a sensor that detects the location of the vehicle 2, such as a global positioning system (GPS) sensor or a self-contained navigation sensor. The navigation device 33 determines the location of the vehicle 2 on a map, audibly or visually provides information about the location, and transmits a signal corresponding to the information to the ECU 5. The "intersections" include not only crossroads but also T junctions, roundabout intersections and the like.

The speed sensor 34 detects the velocity of the vehicle 2. The speed sensor 34 determines the velocity of the vehicle 2 based on the rotational speed of a wheel (not shown) of the vehicle 2, the engine speed or the like, and transmits a signal corresponding to the velocity to the ECU 5.

The acceleration/deceleration sensor 35 detects the acceleration or deceleration of the vehicle 2. The acceleration/deceleration sensor 35 transmits a signal corresponding to the detected acceleration or deceleration to the ECU 5.

According to this embodiment, the velocity and the acceleration or deceleration of the vehicle 2 are separately detected by the speed sensor 34 and the acceleration/deceleration sensor 35. However, the present invention is not limited to this implementation. For example, the alarm system 1 may not be provided with the acceleration/deceleration sensor but may determine the acceleration by performing the time derivative of the velocity of the vehicle 2 detected by the speed sensor.

The speaker 41 and the display 42 are examples of alarm devices of an alarm unit according to the present invention. More specifically, the speaker 41 is an example of a first alarm device according to the present invention, and the display 42 is an example of a second alarm device according to the present invention. The speaker 41 operates based on a received control signal and raises an alarm by outputting an alarm or other sound. The display 42 is a liquid crystal panel, for example. The display 42 operates based on a received control signal and raises an alarm by displaying a picture, text or the like.

The ECU 5 is a controller that controls equipment by transmitting and receiving signals. The ECU 5 may be partially or wholly formed by an analog circuit or formed as a digital processor. The ECU 5 includes an alarm line setting part 51, an object detection part 52, a collision determination part 53, a traffic signal detection part 54, and an alarm unit control part 55.

FIG. 1 shows functions of the ECU 5 in the form of blocks. However, the analog circuit or the software module incorporated in the digital processor of the ECU 5 is not necessarily divided as shown in FIG. 1. That is, the functional blocks shown in FIG. 1 may be further divided, or some of the functional blocks may be integrated into a single functional block. Those skilled in the art can modify the internal configuration of the ECU 5 as appropriate, as far as the processes described later can be performed.

The alarm line setting part 51 sets an alarm line. The alarm line is a virtual line set in the vicinity of the vehicle 2, which is used for determination of collision by the collision determination part 53. The alarm line will be described in more detail later.

The object detection part 52 detects the direction of movement of an object outside the vehicle 2, the distance of the object from an alarm line, and the relative velocity of the object with respect to the alarm line. Specifically, the object detection part 52 performs a predetermined calculation based on a signal received from the side radar 31 and performs the detections based on the calculation result.

The collision determination part 53 performs determination of collision. In determination of collision, it is determined whether or not an object outside the vehicle 2 will cross the alarm line within a predetermined time. The determination of collision will be described in more detail later.

The traffic signal detection part 54 detects a traffic signal emitted by a traffic light in the direction of traveling of the vehicle 2. Specifically, the traffic signal detection part 54 determines the location of the traffic light located in the direction of traveling of the vehicle 2 based on a signal received from the external camera 32 or the navigation device 33. The traffic signal detection part 54 further detects the signal emitted by the traffic light based on the image information obtained by the external camera 32. The detection of the signal emitted by the traffic light can be achieved by various techniques, such as pattern matching. The determination of the location of the traffic light and the detection of the signal can be achieved by other various techniques, such as road-to-vehicle communication or vehicle-to-vehicle communication.

The alarm unit control part 55 transmits a control signal to the speaker 41 or the display 42 based on the result of the determination of collision by the collision determination part 53 or the result of the detection by the traffic signal detection part 54. Specifically, the alarm unit control part 55 transmits a control signal to activate the speaker 41 or the display 42 when the collision determination part 53 determines that the object can collide with the vehicle 2.

Figure 2:
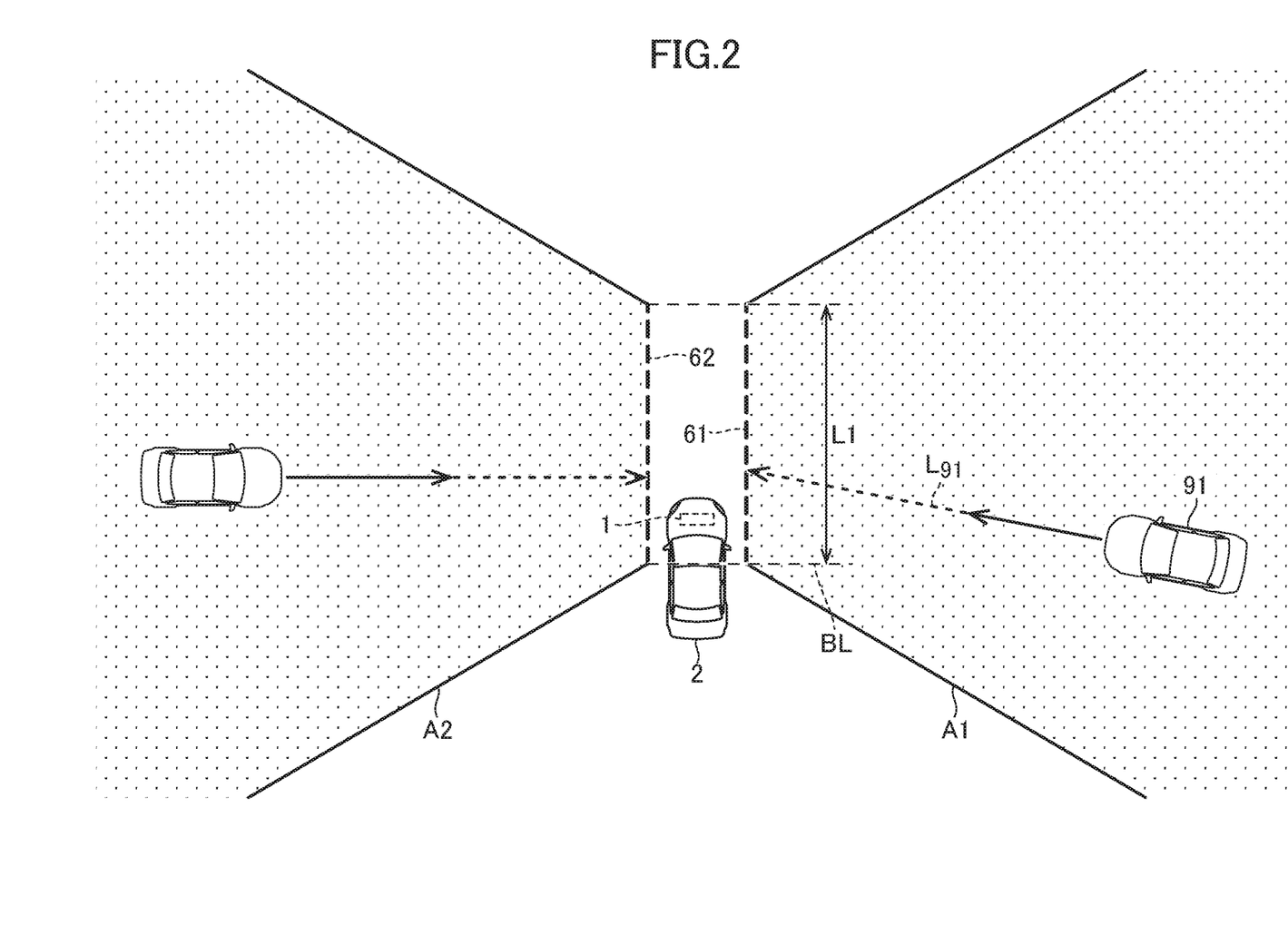
FIG. 2 is a diagram for illustrating determination of collision performed by the alarm system for a vehicle shown in FIG. 1.

Next, with reference to FIG. 2, the determination of collision performed by the alarm system 1 will be described. FIG. 2 is a diagram for illustrating the determination of collision performed by the alarm system 1.

When the vehicle 2 is stopped or running at a relatively low velocity (10 km/h or less, for example), the alarm line setting part 51 (see FIG. 1) of the ECU 5 sets a right alarm line 61 and a left alarm line 62, as shown in FIG. 2. The right alarm line 61 and the left alarm line 62 are invisible virtual lines. The right alarm line 61 is set at a predetermined distance (1 m or less, for example) in the right direction from the right edge of the vehicle 2, and the left alarm line 62 is set at a predetermined distance (1 m or less, for example) in the left direction from the left edge of the vehicle 2. That is, the distance between the right alarm line 61 and the left alarm line 62 is greater than the width of the vehicle 2.

The right alarm line 61 and the left alarm line 62 extend in the forward direction of the vehicle 2 from a base line BL as a base end. The base line BL is a virtual line set rearward from the front edge of the vehicle 2 by a predetermined distance (2 m, for example). The right alarm line 61 and the left alarm line 62 extend straight substantially in parallel with each other in the longitudinal direction of the vehicle 2. The alarm line setting part 51 sets the length of the right alarm line 61 and the left alarm line 62 at L1 (7 m, for example).

The object detection part 52 (see FIG. 1) of the ECU 5 sets a detection region A1 at the right side of the right alarm line 61, and a detection region A2 at the left side of the left alarm line 62. The detection region A1 is defined by the right alarm line 61, a line at a predetermined distance in the right direction from the right alarm line 61, and lines extending from the right alarm line 61 at approximately 135° with respect to the right alarm line 61. The detection region A2 is defined by the left alarm line 62, a line at a predetermined distance in the left direction from the left alarm line 62, and lines extending from the left alarm line 62 at approximately 135° with respect to the left alarm line 62. The object detection part 52 detects an object in the detection regions A1 and A2 based on the signal received from the side radar 31.

In the following, the determination of collision of another vehicle 91 in the detection region A1 approaching the vehicle 2 will be described. When a virtual line $L_{91}$ extending in the direction of movement of the other vehicle 91 intersects with the right alarm line 61, the collision determination part 53 (see FIG. 1) of the ECU 5 calculates a time to collision (TTC) for the other vehicle 91 with respect to the right alarm line 61 based on information detected by the object detection part 52. In general, the TTC is expressed by the following formula f1, provided that the distance between relevant objects is defined as $L_0$, and the relative velocity between the objects is defined as $V_0$. The relative velocity $V_0$ of the object is positive when the object is approaching the alarm line. The formula f1 is derived from the equation of motion on the condition that the object is moving at a constant velocity.

[Formula 1]

$$TTC = \frac{L_0}{V_0} \qquad (f1)$$

The collision determination part 53 determines whether or not the other vehicle 91 will cross the right alarm line 61 within a predetermined time based on the calculated TTC. Specifically, when the TTC is equal to or less than a preset threshold (2 seconds, for example), the collision determination part 53 determines that the other vehicle 91 will cross the right alarm line 61 within a predetermined time (2 seconds, for example). Then, the other vehicle 91 can collide with the vehicle 2.

As described above, the alarm system 1 determines whether the object at the right side of the vehicle 2 can collide with the vehicle 2 or not with respect to the right alarm line 61. Similarly, the alarm system 1 determines whether the object at the left side of the vehicle 2 can collide with the vehicle 2 or not with respect to the left alarm line 62.

The alarm system 1 configured described above is particularly advantageous in a situation where there is a blind spot for the driver of the vehicle 2. An example of the situation where there is a blind spot for the driver is a situation where there is a wall near the lane in which the vehicle is running or a situation where there is another vehicle parked around the vehicle 2. That is, when an object in the blind spot is approaching the vehicle 2 and can collide with the vehicle 2, at least one of the speaker 41 and the display 42 raises an alarm to alert the driver to the object so that the driver can operate the vehicle to avoid collision.

Figure 3:
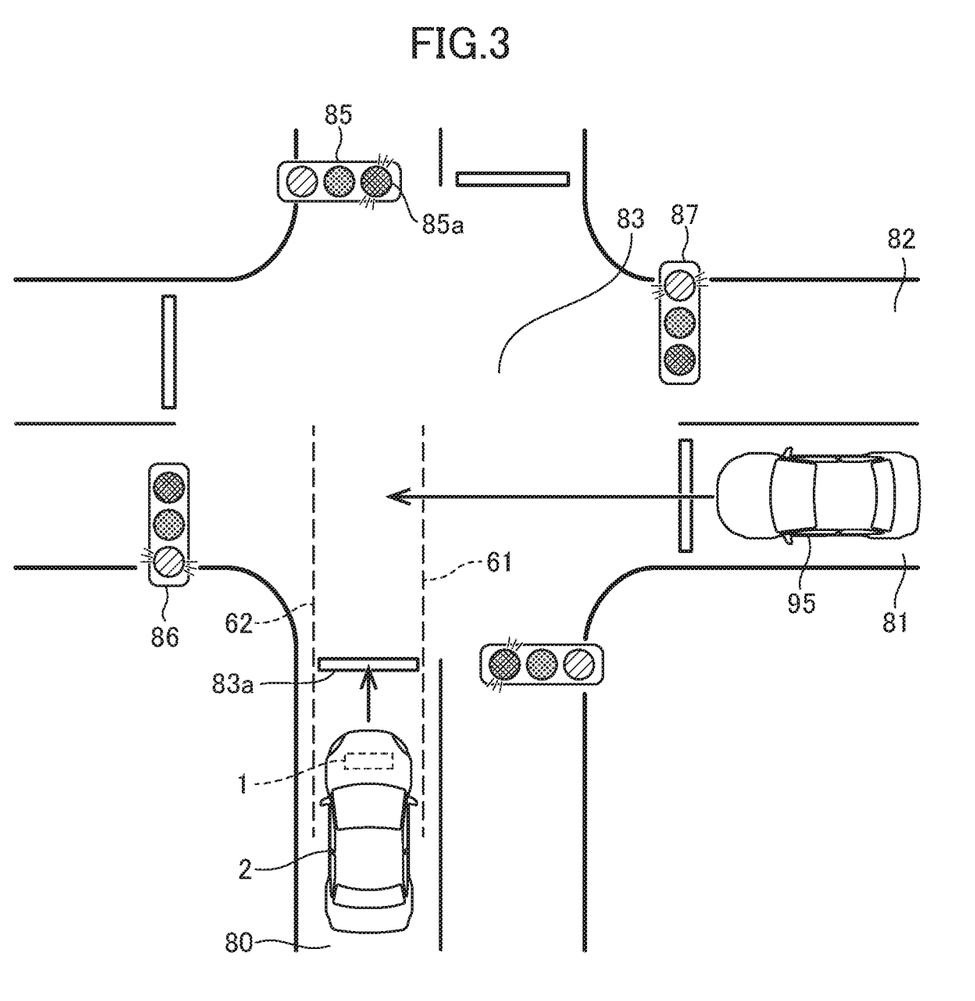
FIG. 3 is a diagram for illustrating determination of collision at an intersection.

Next, with reference to FIG. 3, determination of collision at an intersection will be described. FIG. 3 is a diagram for illustrating determination of collision at an intersection 83. As an example, FIG. 3 shows a situation where the traffic laws prescribe that vehicles run in the left lane, such as in Japan.

At the intersection 83, a lane 80 intersects with lanes 81 and 82. In the following description, the lane 81, which is closer to the vehicle 2 when the vehicle 2 enters the intersection 83, will be referred to as the "first lane 81", and the opposite lane to the first lane 81 will be referred to as the "second lane 82".

Consider a case where the vehicle 2 running in a straight line in the lane 80 is approaching the intersection 83 and there is a traffic light 85 in the direction of traveling of the vehicle 2 as shown in FIG. 3. When a lamp 85a of the traffic light 85 is emitting a stop signal (the so-called "red signal"), the vehicle 2 decelerates to stop at a stop line 83a. When the vehicle 2 decelerates (to 10 km/h or less, for example), the alarm system 1 sets the right alarm line 61 and the left alarm line 62 as described above.

At this point, traffic lights 86 and 87 along the first lane 81 and the second lane 82 are probably emitting a signal (the so-called "green signal") that allows the vehicles in the lanes to move. Therefore, when there is another vehicle 95 running in the first lane 81 and entering the intersection 83, the virtual line in the direction of traveling of the other vehicle 95 may intersect with the right alarm line 61.

When the virtual line intersects with the right alarm line 61, the alarm system 1 calculates the TTC for the other vehicle 95. When the TTC is equal to or less than a threshold, the alarm system 1 determines that the other vehicle 95 can cross the right alarm line 61 within a predetermined time, that is, the other vehicle 95 can collide with the vehicle 2 and raises an alarm to the driver of the vehicle 2.

However, such an approach of the other vehicle 95 to the vehicle 2 is inevitable because of the structure of the intersection 83 and does not necessarily lead to collision of the other vehicle 95 with the vehicle 2 with high possibility. In particular, when the vehicle 2 decelerates to stop at the stop line 83a as in this example, the possibility of the other vehicle 95 colliding with the vehicle 2 is very low. When the alarm system 1 raises an alarm to alert the driver to the other vehicle 95 in this case, the alarm may irritate the driver. For this reason, when the vehicle 2 is decelerating, the alarm system 1 performs an alarm reduction control to suppress the operation of the speaker 41 compared with when the vehicle 2 is not decelerating.

Figure 4:
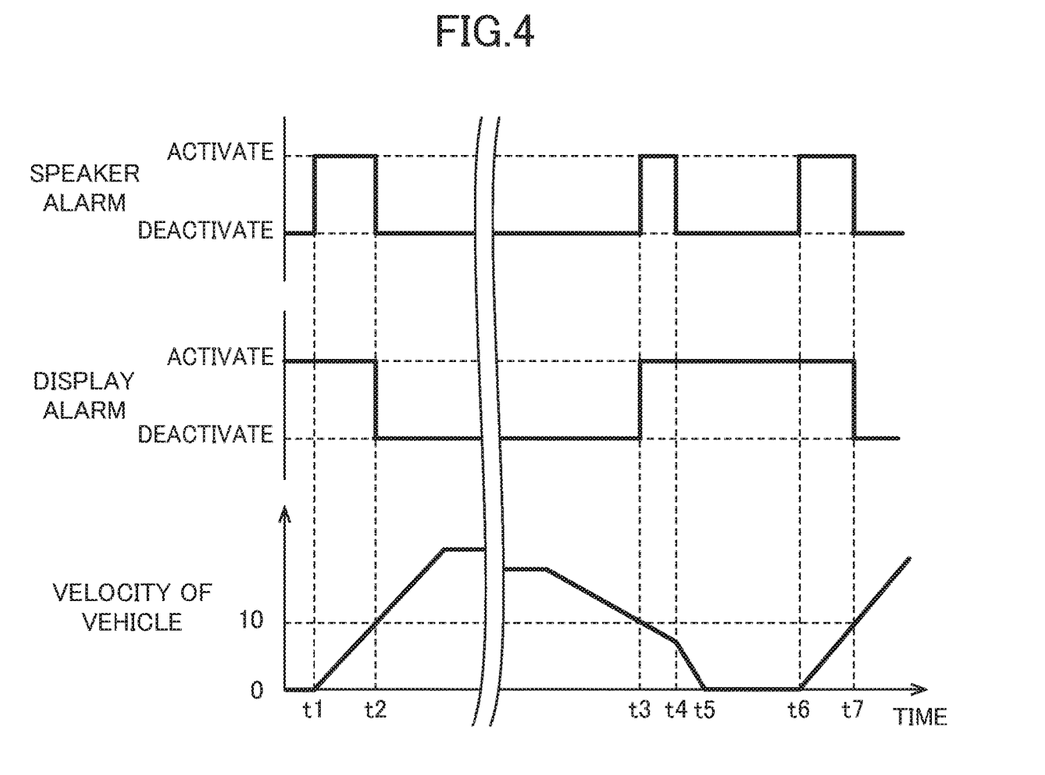
FIG. 4 is a timing chart of alarms from a speaker shown in FIG. 1 and alarms on a display shown in FIG. 1.

Next, with reference to FIG. 4, the alarm reduction control will be described. FIG. 4 is a timing chart of alarms from the speaker 41 and alarms on the display 42. FIG. 4 shows a process in which the vehicle 2 having been stopped starts, decelerates to stop, and then starts again. FIG. 4 also shows whether to activate or deactivate the speaker 41 and the display 42 for alarm when there is an object that can cross the right alarm line 61 or the left alarm line 62 (see FIG. 2) within a predetermined time.

The vehicle 2 is stopped until a time t1. In other words, the velocity of the vehicle 2 is 0 km/h until the time t1. In this phase, the alarm line setting part 51 of the ECU 5 has set the right alarm line 61 and the left alarm line 62. The collision determination part 53 performs determination of collision with respect to the right alarm line 61 or the left alarm line 62. Even when there is an object that can cross the right alarm line 61 or the left alarm line 62 within the predetermined time, the alarm unit control part 55 does not activate the speaker 41. That is, in this phase, the alarm unit control part 55 does not activate the speaker 41 but activates the display 42.

At the time 0, the vehicle 2 starts and accelerates. While the velocity of the vehicle 2 is equal to or less than 10 km/h, the right alarm line 61 and the left alarm line 62 remain set, and the collision determination part 53 performs determination of collision with respect to these lines. The value "10 km/h" mentioned here is an example of a predetermined velocity according to the present invention. In this phase, the alarm unit control part 55 can activate both the speaker 41 and the display 42.

At a time t2, the velocity of the vehicle 2 becomes greater than 10 km/h, and the alarm line setting part 51 cancels the right alarm line 61 and the left alarm line 62. As a result, the collision determination part 53 no longer performs determination of collision, and the alarm unit control part 55 no longer activates any of the speaker 41 and the display 42.

The vehicle 2 then decelerates, and at a time t3, the velocity of the vehicle 2 becomes equal to or lower than 10 km/h. Then, the alarm line setting part 51 sets the right alarm line 61 and the left alarm line 62. The collision determination part 53 performs determination of collision with respect to the right alarm line 61 or the left alarm line 62. The alarm unit control part 55 can activate both the speaker 41 and the display 42.

At a time t4, the deceleration of the vehicle 2 becomes equal to or greater than 5 m/s$^2$. Then, the alarm unit control part 55 no longer activates the speaker 41. That is, when there is an object that can cross the right alarm line 61 or the left alarm line 62 within the predetermined time, the alarm unit control part 55 does not activate the speaker 41 but activates the display 42. The value "5 m/s$^2$" is an example of a predetermined deceleration according to the present invention.

The control of the alarm unit control part 55 suppressing operation of the speaker 41 compared with when the vehicle 2 is not decelerating (the phase from the time t1 to the time t2) is referred to as the "alarm reduction control". After that, the vehicle 2 is stopped at a time t5, and while the velocity of the vehicle 2 is 0 km/h, the alarm unit control part 55 continues performing the alarm reduction control.

At a time t6, the vehicle 2 starts again and accelerates. After that, until a time t7 at which the velocity of the vehicle 2 becomes greater than 10 km/h, the alarm unit control part 55 can activate both the speaker 41 and the display 42, as in the phase from the time t1 to the time t2 described above.

Figure 5:
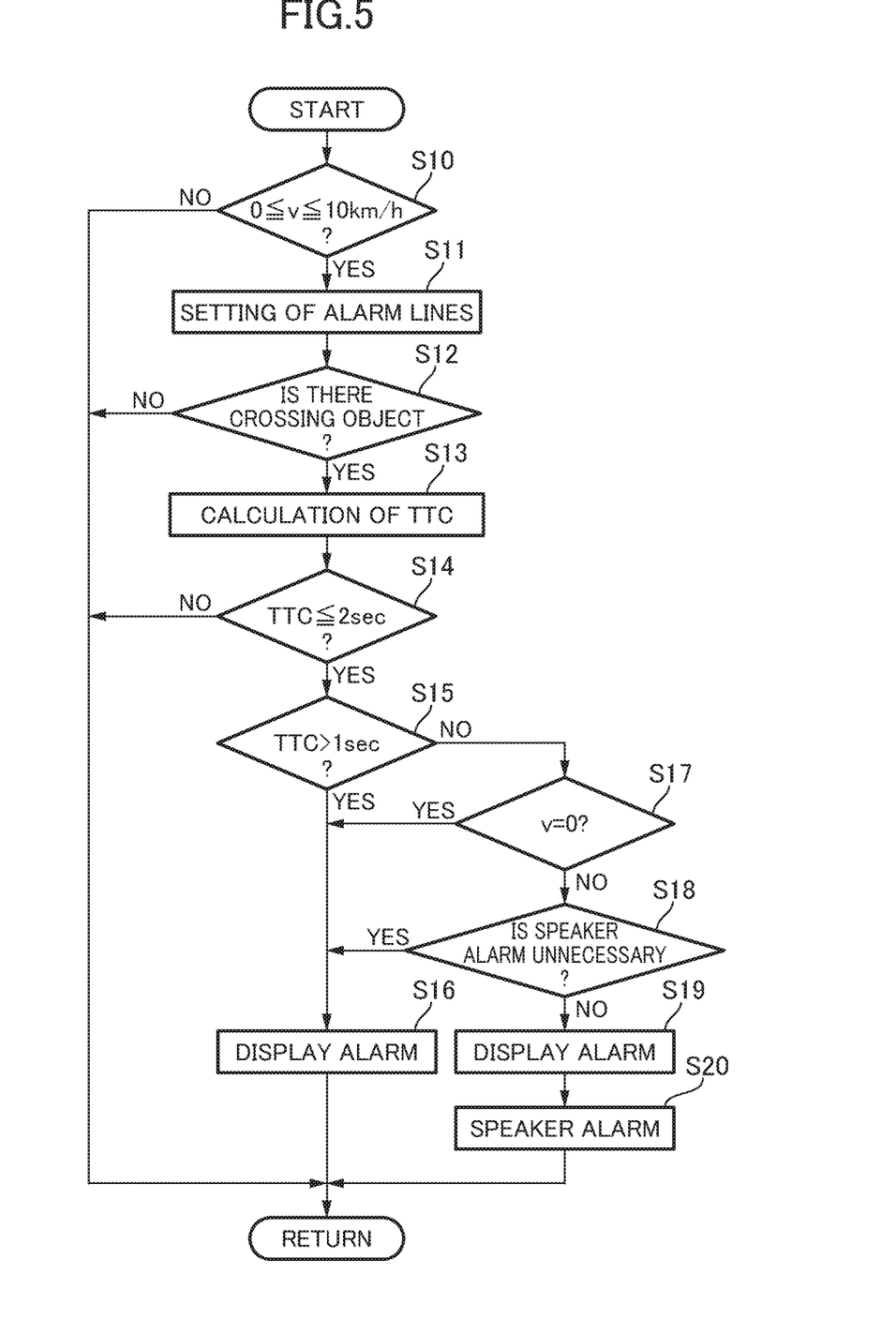
FIG. 5 is a flowchart showing a process performed by the ECU shown in FIG. 1.
Figure 6:
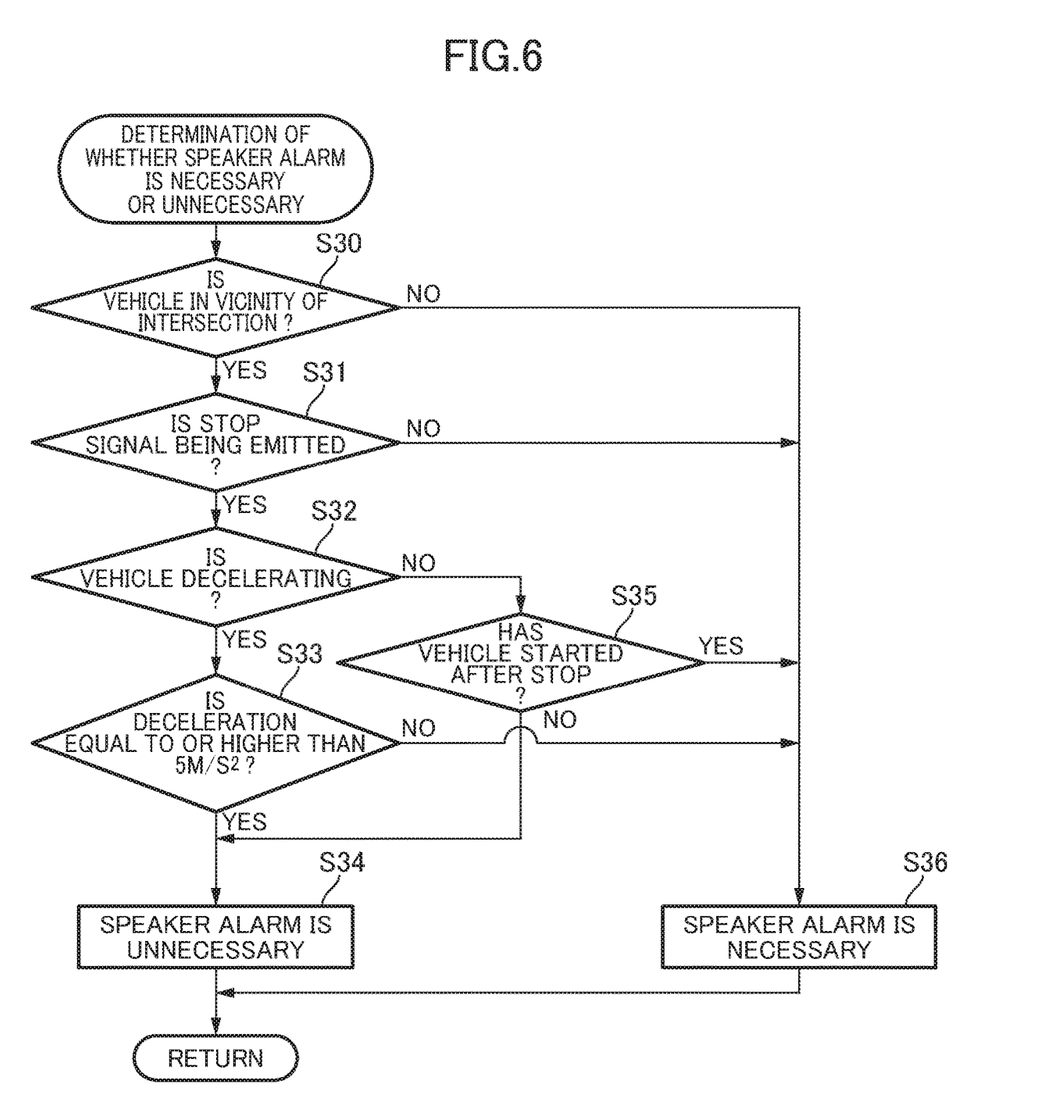
FIG. 6 is a flowchart showing a process performed by the ECU shown in FIG. 1.

Next, with reference to FIGS. 5 and 6, processes performed by the ECU 5 (see FIG. 1) will be described. FIGS. 5 and 6 are flowcharts showing processes performed by the ECU 5. The processes are repeatedly performed at a predetermined period. In the following description, for ease of explanation, any processing that is performed by a functional block of the ECU 5 in a strict sense will be described as being performed by the ECU 5.

First, in Step S10 shown in FIG. 5, the ECU 5 determines whether or not the velocity v of the vehicle 2 falls within a range from 0 km/h to 10 km/h inclusive. The ECU 5 determines the velocity v of the vehicle 2 based on the signal received from the speed sensor 34 (see FIG. 1). When it is determined that the velocity v falls within the range (YES in Step S10), the ECU 5 proceeds to Step S11.

In Step S11, the ECU 5 sets the right alarm line 61 and the left alarm line 62 (see FIG. 2). After completing setting of the right alarm line 61 and the left alarm line 62, the ECU 5 proceeds to Step S12.

In Step S12, the ECU 5 determines whether or not, in the detection region A1 or the detection region A2 (see FIG. 2), there is an object (referred to simply as a "crossing object", hereinafter) whose virtual line extending in the direction of traveling thereof intersects with the right alarm line 61 or the left alarm line 62. The ECU 5 performs the determination based on the signal received from the side radar 31 (see FIG.

1). When it is determined that there is a crossing object (YES in Step S12), the ECU 5 proceeds to Step S13.

In Step S13, the ECU 5 calculates the TTC for the crossing object. The ECU 5 calculates the distance between the crossing object and the right alarm line 61 or the left alarm line 62 and the velocity of the crossing object with respect to the alarm line (that is, the relative velocity) based on the signal received from the side radar. The ECU 5 further calculates the TTC according to the formula f1 described above. When a plurality of crossing objects are detected, the ECU 5 calculates the TTC for each crossing object. After completing calculation of the TTC, the ECU 5 proceeds to Step S14.

In Step S14, the ECU 5 determines whether or not the TTC calculated in Step S13 is equal to or less than 2 seconds. When it is determined that the TTC is equal to or less than 2 seconds (YES in Step S14), the ECU 5 proceeds to Step S15.

In Step S15, the ECU 5 determines whether or not the TTC calculated in Step S13 is more than 1 second. When the TTC is more than 1 second, the necessity for alarm is relatively low. When it is determined that the TTC is more than 1 second (YES in Step S15), the ECU 5 proceeds to Step S16.

In Step S16, the ECU 5 activates the display 42 (see FIG. 1). Specifically, the ECU 5 transmits a control signal to the display 42, and in response to the control signal, the display 42 provides an indication that an object outside the vehicle 2 can collide with the vehicle 2. After making the display 42 display the alarm, the ECU 5 ends the process. That is, when the TTC is equal to or less than 2 seconds (YES in Step S14) and more than 1 second (YES in Step S15), the necessity for alarm is relatively low, so that the ECU 5 does not activate the speaker 41 (see FIG. 1) but activates the display 42 to raise an alarm to the driver of the vehicle 2.

On the other hand, when the TTC is equal to or less than 1 second, the necessity for alarm is relatively high. When it is determined in Step S15 that the TTC calculated in Step S13 is not more than 1 second (NO in Step S15), the ECU 5 proceeds to Step S17.

In Step S17, the ECU 5 determines whether or not the velocity v of the vehicle 2 is 0 km/h. In other words, the ECU 5 determines whether or not the vehicle 2 is stopped. When the vehicle 2 is stopped, the necessity for alarm is relatively low compared with when the vehicle 2 is running. Therefore, when it is determined that the velocity v of the vehicle 2 is 0 km/h (YES in Step S17), the ECU 5 proceeds to Step S16. As described above, in Step S16, the ECU 5 makes the display 42 display an alarm and ends the process. That is, when the TTC is equal to or less than 1 second (NO in Step S15), and the vehicle 2 is stopped (YES in Step S17), the ECU 5 does not activate the speaker 41 but activates the display 42 to raise an alarm to the driver of the vehicle 2.

On the other hand, when it is determined in Step S17 that the velocity v of the vehicle 2 is not 0 km/h (NO in Step S17), or in other words, when the vehicle 2 is not stopped, the ECU 5 proceeds to Step S18.

When the vehicle 2 is not stopped, the necessity for alarm is higher than when the vehicle 2 is stopped. In Step S18, the ECU 5 determines whether or not the alarm from the speaker 41 is necessary. With reference to FIG. 6, a process of the ECU 5 determining the necessity will be described.

In Step S30 shown in FIG. 6, the ECU 5 determines whether or not the vehicle 2 is located in the vicinity of an intersection. The ECU 5 performs the determination based on the signal received from the external camera 32 or the navigation device 33 (see FIG. 1). When it is determined that the vehicle 2 is located in the vicinity of an intersection (YES in Step S30), the ECU 5 proceeds to Step S31.

In Step S31, the ECU 5 determines whether or not a traffic light in the direction of traveling of the vehicle 2 is emitting the stop signal. The ECU 5 performs the determination based on the signal received from the external camera 32 or the navigation device 33 (see FIG. 1). When it is determined that the traffic light is emitting the stop signal (YES in Step S31), the ECU 5 proceeds to Step S32.

In Step S32, the ECU 5 determines whether or not the vehicle 2 is decelerating. The ECU 5 performs the determination based on the signal received from the speed sensor 34 or the acceleration/deceleration sensor 35 (see FIG. 1). When it is determined that the vehicle 2 is decelerating (YES in Step S32), the ECU 5 proceeds to Step S33.

In Step S33, the ECU 5 determines whether or not the deceleration of the vehicle 2 is equal to or higher than 5 $m/s^2$. The ECU 5 performs the determination based on the signal received from the acceleration/deceleration sensor 35. When it is determined that the deceleration of the vehicle 2 is equal to or higher than 5 $m/s^2$ (YES in Step S33), the vehicle 2 is highly likely to stop. Then, the ECU 5 proceeds to Step S34. In Step S34, the ECU 5 determines that the alarm from the speaker 41 is unnecessary.

On the other hand, when it is determined in Step S32 that the vehicle 2 is not decelerating (NO in Step S32), the ECU 5 proceeds to Step S35.

In Step S35, the ECU 5 determines whether or not the vehicle 2 is in a state where the vehicle 2 has started again after having been running at a velocity greater than 10 km/h and then decelerated and stopped. That is, the ECU 5 determines whether or not the vehicle 2 is in the state in the phase from the time t6 to the time t7 shown in FIG. 4. When it is determined that the vehicle 2 is in that state (YES in Step S35), the ECU 5 proceeds to Step S36. In Step S36, the ECU 5 determines that an alarm from the speaker 41 is necessary.

On the other hand, when it is determined in Step S35 that the vehicle 2 is not in the state where the vehicle 2 has started again after having been running at a velocity greater than 10 km/h and then decelerated and stopped (NO in Step S35), the ECU 5 proceeds to Step S34, where the ECU 5 determines that an alarm from the speaker 41 is unnecessary.

On the other hand, when it is determined in Step S30 that the vehicle 2 is not located in the vicinity of an intersection (NO in Step S30), when it is determined in Step S31 that the traffic light in the direction of traveling of the vehicle 2 is not emitting the stop signal (NO in Step S31), or when it is determined in Step S33 that the deceleration of the vehicle 2 is not equal to or higher than 5 $m/s^2$ (NO in Step S33), the ECU 5 proceeds to Step S36. In Step S36, the ECU 5 determines that the alarm from the speaker 41 is necessary.

Referring to FIG. 5 again, the process performed by the ECU 5 will be described. When it is determined in Step S18 that the alarm from the speaker 41 is unnecessary (YES in Step S18), the ECU 5 proceeds to Step S16.

In Step S16, the ECU 5 activates the display 42. Specifically, the ECU 5 transmits a control signal to the display 42, and in response to the control signal, the display 42 provides an indication that an object outside the vehicle 2 can collide with the vehicle 2. After making the display 42 display the alarm, the ECU 5 ends the process. That is, even when the TTC is equal to or less than 1 second (NO in Step S15), when conditions (see FIG. 6) such as that the vehicle 2 is decelerating in the vicinity of the intersection are satisfied, the ECU 5 does not activate the speaker 41 but activates the display 42.

On the other hand, when it is determined in Step S18 that the alarm from the speaker 41 is necessary (NO in Step S18), the ECU 5 proceeds to Step S19.

When the TTC is equal to or less than 1 second (NO in Step S15), and conditions (see FIG. 6) such as that the vehicle 2 is decelerating in the vicinity of the intersection are not satisfied, the necessity for alarm is relatively high. Then, the ECU 5 activates the display 42 to display an alarm in Step S19, and activates the speaker 41 to produce an alarm or other sound in Step S20.

When it is determined in Step S10 that the velocity v of the vehicle 2 does not fall within the predetermined range (NO in Step S10), when it is determined in Step S12 that there is no crossing object (NO in Step S12), or when it is determined in Step S14 that the TTC is not equal to or less than 2 seconds (NO in Step S14), the ECU 5 activates neither the display 42 nor the speaker 41 and ends the process.

[Effects and Advantages]

According to this embodiment, when the vehicle 2 is decelerating, the alarm unit control part 55 performs the alarm reduction control to reduce operation of the alarm unit compared with when the vehicle 2 is not decelerating. As a result, more alarms can be raised to the driver of the vehicle 2 when the possibility of the object colliding with the vehicle 2 is relatively high, whereas alarms that can irritate the driver can be reduced when the possibility of the object colliding with the vehicle 2 is relatively low.

The alarm unit includes the speaker 41, which is the first alarm device, and the display 42, which is the second alarm device. The alarm unit control part 55 activates the speaker 41 and the display 42 when the vehicle 2 is not decelerating. When the vehicle 2 is decelerating, the alarm unit control part 55 does not activate the speaker 41 but activates the display 42 as the alarm reduction control.

With this arrangement, when the vehicle 2 is decelerating (that is, when the possibility of the object colliding with the vehicle 2 is relatively low), the alarm unit control part 55 does not activate the speaker 41, which is the first alarm device, and thereby can reduce alarms that can irritate the driver.

The speaker 41, which is the first alarm device, raises an audible alarm. The display 42, which is the second alarm device, raises a visual alarm.

The audible alarm is more likely to irritate the driver than the visual alarm. With the arrangement described above, when the vehicle 2 is decelerating (that is, the possibility of the object colliding with the vehicle 2 is relatively low), the audible alarm is not raised, so that the driver is less likely to be irritated by alarms.

When the velocity of the vehicle 2 is equal to or less than 10 km/h, the alarm unit control part 55 activates the alarm unit. When the vehicle 2 starts after decelerating from a velocity greater than 10 km/h to stop, the alarm unit control part 55 does not perform the alarm reduction control.

When the vehicle 2 temporarily stops at the intersection and then starts to enter the intersection, the possibility of the vehicle colliding with another vehicle entering the intersection from another direction increases. In such a situation, the alarm reduction control is not performed, so that the driver can be alerted with reliability.

The alarm unit control part 55 performs the alarm reduction control when the deceleration of the vehicle 2 is equal to or higher than 5 m/s$^2$.

With this arrangement, the alarm unit control part 55 can be prevented from performing the alarm reduction control in response to a slight decrease in velocity of the vehicle 2 and thereby failing to alert the driver.

The alarm system 1 includes the traffic signal detection part 54 that detects a traffic signal emitted by a traffic light in the direction of traveling of the vehicle 2. The alarm unit control part 55 performs the alarm reduction control when the traffic light is emitting the stop signal.

With this arrangement, when the vehicle 2 is decelerating in response to the stop signal, the alarm reduction control can be performed with reliability.

According to this embodiment, as an example of the alarm reduction control, of the speaker 41 and the display 42, operation of the speaker 41 is suppressed. However, the alarm reduction control according to the present invention is not limited to this implementation. For example, the alarm reduction control may include changing the volume or pattern of the audible alarm or the color or contents of the visual alarm to reduce irritation to the driver. Furthermore, the alarm unit may be a vibrator that makes the steering wheel or driver's seat in the vehicle vibrate to alert the driver by the vibration generated by the alarm unit. In that case, as the alarm reduction control, the strength or pattern of the vibration may be changed to reduce irritation to the driver, for example.

REFERENCE SIGNS LIST 1 alarm system for vehicle (alarm system)
2 vehicle
41 speaker (first alarm device)
42 display (second alarm device)
51 alarm line setting part
52 object detection part
53 collision determination part
54 traffic signal detection part
55 alarm unit control part
61 right alarm line (alarm line)
62 left alarm line (alarm line)

What is claimed is:

1. An alarm system for a vehicle, comprising:
   an alarm line setting part that sets an alarm line extending forward from the vehicle;
   an object detection part that detects an object on a side of the vehicle;
   a collision determination part that determines whether or not the object crosses the alarm line within a predetermined time; and
   an alarm unit control part that activates an alarm unit when the collision determination part determines that the object crosses the alarm line within the predetermined time,
   wherein the alarm unit control part performs an alarm reduction control to reduce operation of the alarm unit when the vehicle is decelerating compared with when the vehicle is not decelerating.

2. The alarm system for a vehicle according to claim 1, wherein the alarm unit includes a first alarm device and a second alarm device;
   the alarm unit control part activates the first alarm device and the second alarm device when the vehicle is not decelerating; and
   the alarm unit control part does not activate the first alarm device but activates the second alarm device as the alarm reduction control when the vehicle is decelerating.

3. The alarm system for a vehicle according to claim 2, wherein the first alarm device audibly raises an alarm; and
   the second alarm device visually raises an alarm.

4. The alarm system for a vehicle according to claim 1, wherein the alarm unit control part activates the alarm unit when a velocity of the vehicle is equal to or less than a predetermined velocity; and the alarm unit control part does not perform the alarm reduction control when the vehicle starts after having decelerated from a velocity greater than the predetermined velocity and stopped.

5. The alarm system for a vehicle according to claim 2, wherein the alarm unit control part activates the alarm unit when a velocity of the vehicle is equal to or less than a predetermined velocity; and the alarm unit control part does not perform the alarm reduction control when the vehicle starts after having decelerated from a velocity greater than the predetermined velocity and stopped.

6. The alarm system for a vehicle according to claim 3, wherein the alarm unit control part activates the alarm unit when a velocity of the vehicle is equal to or less than a predetermined velocity; and the alarm unit control part does not perform the alarm reduction control when the vehicle starts after having decelerated from a velocity greater than the predetermined velocity and stopped.

7. The alarm system for a vehicle according to claim 1, wherein the alarm unit control part performs the alarm reduction control when a deceleration of the vehicle becomes equal to or greater than a predetermined deceleration.

8. The alarm system for a vehicle according to claim 2, wherein the alarm unit control part performs the alarm reduction control when a deceleration of the vehicle becomes equal to or greater than a predetermined deceleration.

9. The alarm system for a vehicle according to claim 3, wherein the alarm unit control part performs the alarm reduction control when a deceleration of the vehicle becomes equal to or greater than a predetermined deceleration.

10. The alarm system for a vehicle according to claim 4, wherein the alarm unit control part performs the alarm reduction control when a deceleration of the vehicle becomes equal to or greater than a predetermined deceleration.

11. The alarm system for a vehicle according to claim 1, further comprising a traffic signal detection part that detects a traffic signal emitted by a traffic light in the direction of traveling of the vehicle, wherein the alarm unit control part performs the alarm reduction control when the traffic light is emitting a stop signal.

12. The alarm system for a vehicle according to claim 2, further comprising a traffic signal detection part that detects a traffic signal emitted by a traffic light in the direction of traveling of the vehicle, wherein the alarm unit control part performs the alarm reduction control when the traffic light is emitting a stop signal.

13. The alarm system for a vehicle according to claim 3, further comprising a traffic signal detection part that detects a traffic signal emitted by a traffic light in the direction of traveling of the vehicle, wherein the alarm unit control part performs the alarm reduction control when the traffic light is emitting a stop signal.

14. The alarm system for a vehicle according to claim 4, further comprising a traffic signal detection part that detects a traffic signal emitted by a traffic light in the direction of traveling of the vehicle, wherein the alarm unit control part performs the alarm reduction control when the traffic light is emitting a stop signal.

* * * * *